US010569880B2

(12) United States Patent
Heidtmann et al.

(10) Patent No.: US 10,569,880 B2
(45) Date of Patent: Feb. 25, 2020

(54) ARRANGEMENT FOR SELECTIVELY ARRESTING A SERVING TROLLEY IN A CABIN OF A TRANSPORTATION SYSTEM

(71) Applicant: Airbus Operations GmbH, Hamburg (DE)

(72) Inventors: Andreas Heidtmann, Hamburg (DE); Roland Lange, Hamburg (DE); Lasse Jensen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 354 days.

(21) Appl. No.: 15/604,280

(22) Filed: May 24, 2017

(65) Prior Publication Data

US 2017/0341751 A1  Nov. 30, 2017

(30) Foreign Application Priority Data

May 25, 2016 (DE) .................. 10 2016 109 722

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01); *Y02T 50/46* (2013.01)

(58) Field of Classification Search
CPC ....... B64D 11/04; B64D 11/00; B64D 11/007; Y02T 50/46
USPC ............................................... 244/119, 137.1
See application file for complete search history.

(56) References Cited

U.S. PATENT DOCUMENTS

| 5,465,660 A * | 11/1995 | Conti ................... B30B 9/3003 100/100 |
| 7,780,114 B2 * | 8/2010 | Doebertin .............. B64D 11/04 244/118.5 |
| 9,573,689 B2 * | 2/2017 | Schliwa ............. B64D 11/0691 |
| 10,189,571 B2 * | 1/2019 | Seibt ...................... B64D 11/02 |
| 2013/0169130 A1 * | 7/2013 | Seeck ................ B64D 11/0007 312/236 |
| 2015/0059363 A1 * | 3/2015 | Burd ..................... B62B 5/0447 62/3.62 |
| 2017/0043857 A1 * | 2/2017 | Seibt ..................... B64C 1/1407 |

FOREIGN PATENT DOCUMENTS

WO   2015014850 A1   2/2015

* cited by examiner

*Primary Examiner* — John Cooper
(74) *Attorney, Agent, or Firm* — Lorenz & Kopf LLP

(57) ABSTRACT

An arrangement for selectively arresting a serving trolley in a cabin includes a walling extending perpendicularly to a cabin floor. The walling has a height at least equal to the height of a serving trolley. The arrangement has an upper arresting unit positioned at an upper fastening section of the walling and a lower arresting unit positioned at a lower fastening section of the walling. The upper arresting unit has a first engagement element and a second engagement element, wherein at least one of the engagement elements is movable relative to the other engagement element. The upper arresting unit releasably engages two distanced recesses at an upper end of the serving trolley by way of the engagement elements. The lower arresting unit includes at least one third engagement element and is designed for engaging a bottom side component of the serving trolley by way of the third engagement element.

15 Claims, 5 Drawing Sheets

ARRANGEMENT FOR SELECTIVELY ARRESTING A SERVING TROLLEY IN A CABIN OF A TRANSPORTATION SYSTEM

CROSS-REFERENCE TO RELATED APPLICATION

This application claims the benefit of, and priority to, German patent application number DE 102016109722-5, filed May 25, 2016.

TECHNICAL FIELD

Embodiments of the invention relate to an arrangement for selectively arresting a serving trolley in a cabin of a transportation system, in particular a cabin of a commercial aircraft. An embodiment of the invention further relates to a transportation system having a cabin created therein as well as an arrangement for selectively arresting a serving trolley in the cabin.

BACKGROUND

In the design of passenger cabins for transport systems, in particular for commercial aircraft, a challenge lies in maximizing the number of accommodatable passenger seats in the cabin with a constant volume of the space and maintained or improved comfort. Seats for vehicle attendants as well as galleys and toilets, which are provided for all persons, limit the available space for passenger seats. Concepts and design variants are known, in which these common installations be compacted if possible. For this, an approach lies in utilizing multifunctional installations, which serve for a plurality of tasks. For example, it is known to load, unload or hold serving trolleys not within predetermined parking spaces in a galley, but also at other, temporarily unused regions. In particular, in commercial aircraft it is reasonable for this to be able to conduct an arresting of a serving trolley, such that a serving trolley cannot move on its own during unforeseen motions of the aircraft.

From WO 2015/014850 A1 it is known to provide a partition wall in a cabin of an aircraft, which comprises a flat, foldable-out element, under which a serving trolley is firmly clampable.

BRIEF SUMMARY

Presented herein is a device or an arrangement having a device for selectively arresting a serving trolley, which is designed as simple as possible, comprises a low weight and may be arranged at most diverse locations within a cabin of a transport system.

An exemplary embodiment of an arrangement for selectively arresting a serving trolley in a cabin of a transportation system has the features of independent claim 1. Advantageous embodiments and further improvements may be gathered from the sub-claims and the following description.

It is proposed an arrangement for selectively arresting a serving trolley in a cabin of a transportation system, the arrangement comprising a walling running perpendicular to a cabin floor, which walling comprises a height, which at least equals the height of a serving trolley; an upper arresting unit positioned at an upper fastening section of the walling and a lower arresting unit arranged at a lower fastening section of the walling at a distance from the upper fastening section. The upper arresting unit comprises a first engagement element and a second engagement element, wherein at least one the first engagement element and the second engagement element is movable relative to the respective other engagement element. The upper arresting unit is designed for releasably engaging two distanced recesses at an upper end of the serving trolley by way of the first and second engagement element. The lower arresting unit comprises at least one third engagement element and is designed for engaging a bottom side component of the serving trolley.

Consequently, the arrangement according to an embodiment of the invention may selectively and on demand arrest a serving trolley in a cabin of a transportation system at a walling that runs perpendicular to a cabin floor. In this context, the term "selectively" is to be understood that a serving trolley is merely arrested on demand and, of course, may easily be released on demand.

The walling that runs perpendicular to the cabin floor may be a separate partition wall, which exemplarily separates a passenger seat region from a door region and/or a galley region within the cabin. These types of partition walls particularly serve for an optical division of the cabin and improve the comfort of passengers, which are on seats that directly face the separated cabin region. At the same time, the walling may also be a part of a cabin monument, which, particularly in an aircraft, may be a galley monument, a toilet monument, a monument with stowage bins or a combination of two or more such monuments.

If the transportation system comprises a cabin walling, which is flat or planar, respectively, at least in a region that connects to the floor, or if a flat or planar additional walling may be connected thereto, such a region may also be used for receiving an upper and a lower arresting unit.

In the context of certain embodiments of the invention, a serving trolley is to be understood as an often box-shaped receptacle, which is movable on wheels within the cabin and serves for receiving and storing meals, beverages, waste and other objects. Such serving trolleys are widely standardized at least for the use in commercial aircraft, such that a problem-free replacement of serving trolleys between different aircraft types is possible and hence, a filling of serving trolleys is possible also outside of the cabin. A serving trolley usually comprises compartments for receiving tablets, inserts or similar components. A so-called "half-size trolley" comprises a length of about 40 cm, while a so-called "full-size trolley" comprises a length of about 75 cm. The width of such serving trolleys is usually about 30 cm, while the height is about 1 m.

Such serving trolleys comprise a housing, which is manufactured from aluminum at least partially and comprises a depression at a top side that is enclosed by handles and allows for placing objects. The handles usually extend over substantially the whole width of a serving trolley and are realized by way of a transverse strut with recesses underneath for leading through a hand of a user.

A serving trolley further comprises a bottom, which carries wheels that are partially steerable, with which the serving trolleys stands on the cabin floor. For arresting the wheels, usually arresting devices are utilized, which often have paddles that are marked with colors.

The upper arresting unit comprises two engagement elements, which can be brought into engagement with distanced recesses of the serving trolley. The upper arresting unit is provided for an engagement with recesses at an upper end of the serving trolley, exemplarily the recesses of the handles at two opposed ends in longitudinal direction of the serving trolley as mentioned above. The engagement elements may assume any possible shape, which allows to conduct this engagement.

For example, elongate engagement elements are conceivable, which extend substantially in a plane parallel to the cabin floor. The engagement elements may be arranged at two opposed ends of the upper arresting unit and may exemplarily be designed for gripping a lateral section of the serving trolley, which is created by opposed recesses, at the upper end in a plier-like manner. For enabling the insertion of the upper end of the serving trolley into the upper arresting unit, it is thus reasonable that at least one of the both engagement elements is movable relative to the other engagement element. Hereby, the clearance between the engagement elements is at least partially increased in order to reduce this distance after or during positioning the serving trolley to the walling and to conduct a full engagement of both engagement elements by this.

It is particularly advantageous to position a lateral face of the serving trolley at the walling for the arresting, such that the serving trolley only extends from the walling outwards over a least possible distance and that additionally the required holding moment at the engagement elements due to mass and inertia forces is reduced by the least possible distance of the center of gravity of the serving trolley to the walling in this position.

Due to the movability of both engagement elements relative to each other it may also be facilitated, if desired, to arrest serving trolleys with different lengths, i.e., half-size trolleys or full-size trolleys, on desire, through the arrangement. As described above, serving trolleys of different types are known, whose different lengths may be compensated through a respective motion of one of both engagement elements to each other.

The lower arresting unit comprises at least one third engagement element and may additionally reach a holding device or structure at a lower section of the serving trolley. Hereby, a bottom side component is enclosed or held, which in combination with the holding device or structure through the upper arresting unit improves the additional fixation of the bottom side of the serving trolley relative to the walling.

In this context, a bottom side component of the serving trolley may be realized relatively arbitrarily. However, since serving trolleys usually meet a certain standard, it particularly suggests itself to dimension the third engagement element in such a way, that one of the wheels arranged at a bottom side is enclosed between the walling and the third engagement element. Since the movability of the serving trolley along the walling is almost fully prevented through the fixation of the serving trolley through the first and the second engagement element, the one-sided fixation of a bottom side component may be sufficient. A moment about an axis between the first and the second engagement element may thereby be compensated. For the conception of the third engagement element it is to be provided for supporting the third engagement element in a movable manner, such that it is bringable into an engagement position and a release position.

To sum up, consequently a weight and space-saving facility for selectively arresting serving trolleys in a cabin of a transportation system is created by the arrangement. The two-part design allows a very simple and also retrofit installation as well as a low manufacturing effort. A fixation of the serving trolley is prevented in all spatial directions. A translatory movement of the serving trolley at the walling along or in a direction transverse thereto is also prevented as well as a rotation around a vertical axis or about horizontal axes.

In an advantageous embodiment, the upper arresting unit comprises a stop component, which runs perpendicular to the walling and parallel to the cabin floor, which stop component comprises a bottom side facing the cabin floor, the bottom side having a height that corresponds to the height of the serving trolley. The first engagement element and the second engagement element are arranged at two opposed ends of the elongate stop component. The stop component may in a most simple case be an angled profile component, which is connectable to the walling and comprises a region, which extends parallel to the floor from the walling. Besides providing the first and the second engagement element, the stop component substantially serves for a fixation of the serving trolley in a direction perpendicular to the cabin floor. In particular with the integration into a commercial aircraft it cannot be ruled out that the aircraft is subjected to momentary variations in the flight altitude during unforeseeable turbulences and that the serving trolley, due to its inertia, urges into an upward relative motion, i.e. facing away from the cabin floor, at least as an impulse. This may be prevented through the stop component. Consequently, the serving trolley is fixated between the cabin floor and the stop component in a vertical direction more robustly.

Preferably, the first engagement element and the second engagement element each are designed as a thorn-like component, which substantially extend parallel to the cabin floor. The term "thorn-like" stands for an at least in a region tapering shape, which ends in a substantially elongate, at least approximately and at least in a region pointed shape. The advantage of using such a shape lies in the fact that the engagement elements are easily introducible into the designated recesses of the serving trolley and in that when a predetermined end position between recess and engagement element is reached, a flush nestling of the serving trolley to the walling is improved. The detail design of the engagement element depends on the position and shape of the recesses and should be adapted hereto by a skilled person. Due to their orientation parallel to the cabin floor the engagement elements preferably face each other.

In a preferred embodiment, at least one of the first engagement element and the second engagement element is movable in a plane arranged parallel to the cabin floor. In doing so, an increase of the distance of these both engagement elements to each other may be achieved selectively, which facilitates the introduction of the serving trolley into the arrangement or enables it at all. The movability may be provided through the engagement element itself, as an alternative thereto also by its support on the upper arresting unit. The movement may be both a linear motion or a rotary motion or a combination thereof.

The upper arresting unit itself may comprise a variable length, e.g., through using of two overlapping sub-sections of an elongate component, which are movable and arrestable relative to each other.

When using the elongate stop component, one of the first engagement element and the second engagement element may be movably supported along a longitudinal direction of the stop component. This may be realized through a respective, direct support on the stop component or indirectly through a holding element that is supported to be movable along the stop component, which holding element holds one of the first and the second engagement element. Hereby, the upper arresting unit may be adapted to serving trolleys with different lengths. Depending on the design of the first or second engagement element, this may also allow the introduction of a serving trolley into the upper arresting unit, such as with a rigid receiving of the engagement elements, whereinafter, e.g., through a respective spring or release mechanism, a locking of the engagement elements in the recesses is conducted, with which the length of the stop component or the distance between the engagement elements, respectively, is adapted to the length of the serving trolley again.

It is advantageous if the first engagement element is rigidly supported on the upper arresting device and if the second engagement element is bringable into an insertion position and a locking position, wherein the second engagement element is designed for automatically reaching the locking position during insertion of the upper end of the serving trolley into the arrangement. With such an embodiment, it is conceivable that in an insertion position of the second engagement element, a distance between both engagement elements is adjusted, which exceeds the length of the serving trolley. A recess of the serving trolley may then be hooked into the first engagement element, such that with a hooked recess the serving trolley is consequently swiveled around the first engagement element as a fixed point towards the walling in order to subsequently introduce the engagement element into the corresponding recess or to let it snap in there. In particular, with the second engagement element being rotatably supported, a surface contact between the serving trolley and a guiding section of the second engagement element may be achieved through swiveling the serving trolley, which surface contact urges the second engagement element into the locking position. A latching mechanism coupled with the second engagement element may subsequently hold the second engagement element releasably in the locking position.

In a further embodiment, the second engagement element may alternatively or additionally be movable in a plane, which runs parallel to the walling. The hooking of the second engagement element may consequently also comprise a vertical motion of the second engagement element as a movement component, with which the second engagement element may further be distanced from the cabin floor selectively.

In an equally advantageous embodiment, the upper arresting unit comprises a device, component, or structure configured to move the upper arresting unit in a direction perpendicular to the floor. Hereby, selectively the upper arresting unit may be adapted to different models of serving trolleys, in particular with different heights and/or the arresting of a serving trolley may be conducted.

The lower arresting unit preferably comprises a third engagement element, which is supported so as to be foldable to the walling. Due to the capability of the third engagement element to engage with a bottom side component, the third engagement element may protrude relatively far from the cabin walling slightly above the cabin floor if it is in a use position. For ruling out potential injury risks it is in particular favorable to fold the third engagement element into a storage position to the walling selectively, with which it is preferably substantially flush with the walling. Depending on the detail design of the third engagement element, it may be conceivable to utilize a strap hinge, which comprises a particularly flat design.

In a particularly advantageous embodiment, the first engagement element and the third engagement element extend into the same direction. Each of these engagement elements comprises a main extension direction, through which the function of the respective engagement element is determined. With an identical orientation of the main extension directions of both engagement elements, the serving trolley may initially be guided substantially obliquely to the wall to the arrangement when arresting in the arrangement according to certain embodiments of the invention, such that the bottom side component and a recess of the serving trolley corresponding to the first engagement element conduct an engagement with the respective engagement element. Afterwards, the serving trolley is swiveled flush to the walling in order to subsequently engage with the second engagement element. The main extension directions may particularly lie in planes that are arranged parallel to each other, which may furthermore run parallel to the cabin floor.

It is advantageous if the third engagement element comprises a flat, hook-shaped design. Through the flat design, the third engagement element may be folded flush to the walling if it is not required. A hook shape facilitates the engagement with a bottom side component, e.g. a wheel or a pair of wheels. Hereby, also the swiveling of the serving trolley to the walling is facilitated. A hook-shaped design may also manifest itself in a thorn-like extension, which in an engagement state is distanced as far from the walling as a provided engagement surface of the respective bottom side component.

The third engagement element may, if it is foldably supported, comprise a locking device, through which the folded down state is held. When advancing the serving trolley, it may be prevented that an edge or a surface of the serving trolley folds the third engagement element back to the walling when the serving trolley is imprecisely oriented. The locking mechanism should, in particular when used in a transport system, be operable substantially reliable and precise and may exemplarily be equipped with a pedal for a foot operation.

The movable first or second engagement element may also be equipped with a locking mechanism, which may arrest an adjusted relative position of both engagement elements to each other. Hereby, the arresting of the serving trolley is ensured and cannot be released even with the largest mass or inertia forces. The locking mechanism at the upper arresting unit does not need to be equipped with a foot pedal, as due to the adaption of the height to the height of a serving trolley, an ergonomical working position is given, such that a hand operable locking element is conceivable. Besides a simple design with a holding pin, which exemplarily is secured by a latching mechanism, also more complex locking/latching mechanisms are conceivable.

An embodiment of the invention further relates to an aircraft having a passenger cabin created therein as well as at least one arrangement for selectively arresting of serving trolleys explained above.

The walling may preferably belong to a cabin monument.

In particular, the walling may at least partially be directed into a door region of an aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present invention result from the following description of the exemplary embodiments illustrated in the figures. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
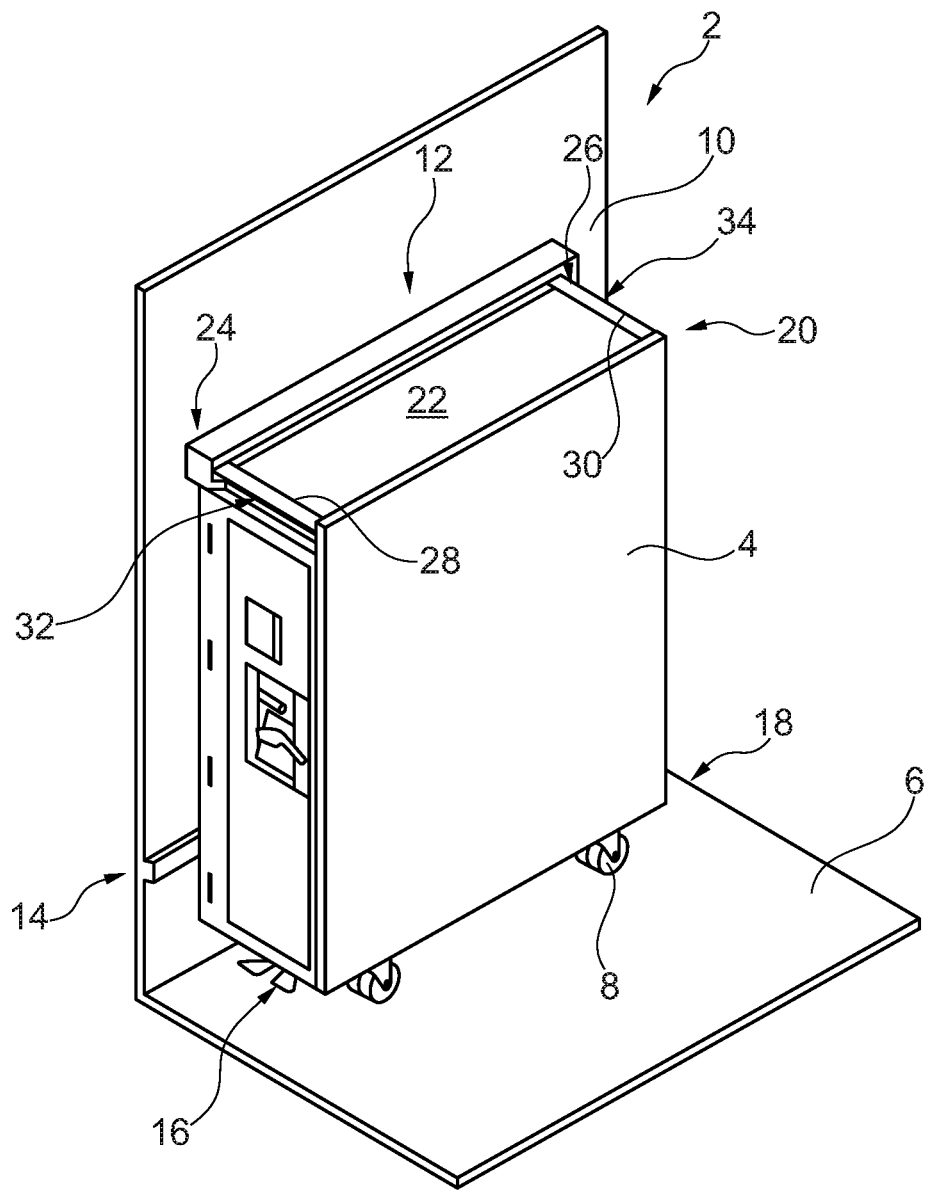
FIG. 1 shows an arrangement having a serving trolley in a three-dimensional view.

FIG. 1 shows an arrangement 2 for selectively arresting a serving trolley 4 in a three-dimensional, simplified view. Here, a horizontal ground surface 6 as a part of a cabin floor is shown, on which the serving trolley 4 stands with its wheels 8. Exemplarily, also a walling 10 that runs perpendicular to the ground surface 6 is shown here, at which the serving trolley substantially nestles. At the walling 10, an upper arresting unit 12 and a lower arresting unit 14 are arranged, which, as illustrated in the following in detail, conduct an arresting of the serving trolley 4.

The serving trolley 4 shown here may exemplarily correspond to the "Atlas" standard trolley and exemplarily comprises a length of 0.75 m, a width of 30 cm and a height of 1 m. This serving trolley 4 is also known as a "full-size" serving trolley and comprises a rigid, box-shaped housing, which rests on four pairs of wheels 8, which are selectively blockable through an arresting mechanism provided with pedals 16. The pairs of wheels 8 and pedals 16 are arranged at a bottom side end 18 of the serving trolley 4.

At a top side or an upper end 20, respectively, the serving trolley 2 in turn comprises a storage surface 22, which is slightly indented and which is equipped with handles 28 and 30 at its longitudinal sides 24 and 26. The handles 28 and 30 each comprise a recess 32 or 34, respectively, through which the fingers of a hand can be led through. Herewith, the serving trolley 4 may be held, pushed or pulled comfortably. The further, variable and particularly inner design is not relevant for the arrangement 2 according to the embodiments of the invention and is thus not further considered.

Figure 2:
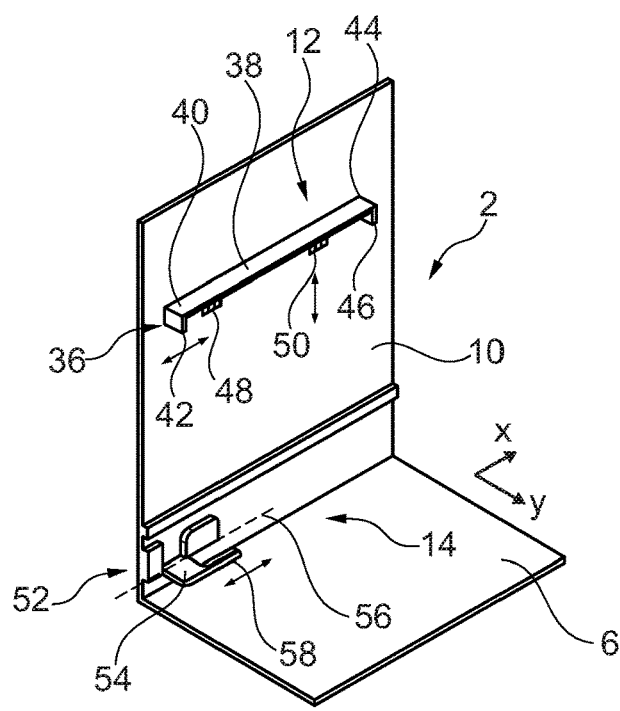
FIG. 2 shows the arrangement of FIG. 1 without serving trolley.

FIG. 2 shows the arrangement 2 without the serving trolley 4 for further explanation. The upper arresting unit 12 is arranged at an upper fastening section 36 of the walling 10 and comprises an elongate stop component 38, which extends substantially perpendicular to the walling 10 and substantially parallel to the ground surface 6. At a first end 40 of the stop component 38, a first engagement element 42 is arranged, at an opposed second end 44, a second engagement element 46 is mounted. Both engagement elements 42 and 46 are designed as thorn-like bodies, which each face to the respective other engagement element 42 or 46, respectively. A connecting line between the engagement elements 42 and 46 thus runs parallel to the elongate stop component 38.

By way of vertical guiding rails 48 and 50, the upper arresting device 12 is movable exemplarily in a direction perpendicular to the ground surface 6 in order to ensure an adaption to serving trolleys 4 with different designs. A goal is to let engagement elements 42 and 46 engage with the recesses 32 and 34 of the serving trolley 4 in order to achieve a fixation of the serving trolley in a direction, which is in a plane parallel to the ground surface 6. If the serving trolley 4 is advanced to the walling 10, the engagement elements 42 and 46 may engage in the recesses 32 and 34, such that the upper end of the serving trolley 4 consequently cannot be released from the walling 10 anymore.

For enabling or facilitating an engagement of the engagement elements 42 and 46 with the recesses 32 and 34, the distance between the engagement elements 42 and 46 may selectively be increased. This may for example be accomplished by the second engagement element 46 at least in a section being movable in a direction parallel to a main extension axis of the elongate stop component 38 and being arrestable in a desired insertion position. Preferably, an arresting is accomplished through a spring mechanism, e.g. supported through a locking/latching mechanism, with which automatically a latching of the second engagement element 46 in an insertion position or a latching position is accomplished. This may be released through an operating element not shown here.

The lower arresting unit 14 is arranged at a lower fastening section 52 and comprises a third engagement element 54. It is a flat component, which is supported in a swivable manner about an axis 56 that is parallel to the walling 10 and the ground surface 6 and is shown in a folded out use or insertion position, respectively, in FIG. 2. The third engagement element 54 exemplarily comprises a distinct elongate extension 58, which comprises a clear distance from the walling 10. This is dimensioned in a way that the elongate extension 58 is able to enclose a pair of wheels 8 together with the walling 10, which pair of wheels 8 faces the walling 10. In other words, the lower arresting unit 14 is designed for engaging into a bottom side component in form of the pair of wheels 8 or another component through the third engagement element 54.

Figure 3:
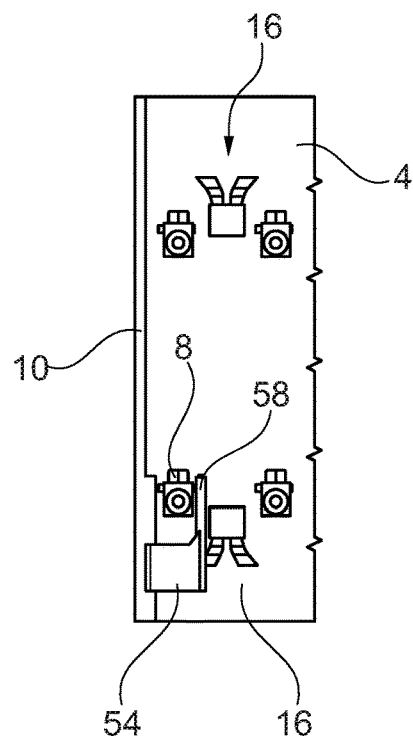
FIG. 3 shows a lower arresting unit in engagement with a pair of wheels of a serving trolley from underneath the serving trolley.

FIG. 3 shows the third engagement element 54 in an operating position with a pair of wheels 8 facing the walling 10, being enclosed between the elongate extension 58 and the walling 10. In FIG. 3, the arrangement 2 is shown from a bottom side. Here, with an illustrated serving trolley 4, it is apparent that a distance between the pedals 16 and the pair of wheels 8 exists in a lateral direction, through which the elongate extension 58 is guidable.

Altogether, the arrangement 2 provides for an arresting of a serving trolley 4 in all spatial directions or for receiving of forces and moments in or around, respectively, all six axes.

Figure 4A:
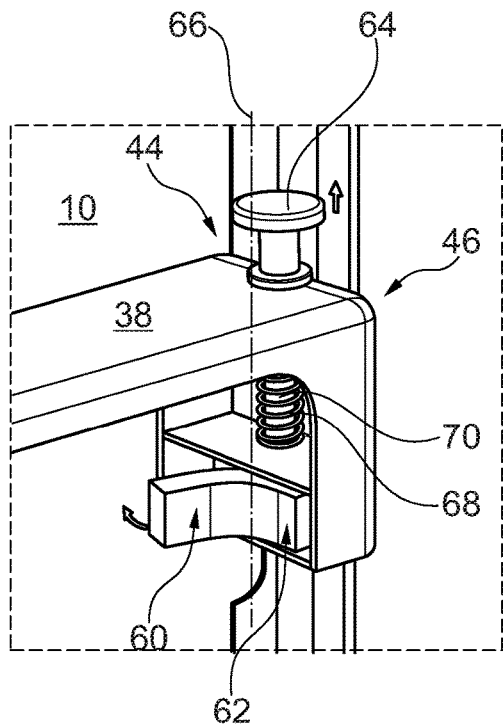
FIGS. 4a, 4b, and 4c show a detail of a second engagement element in different positions.
Figure 4B:
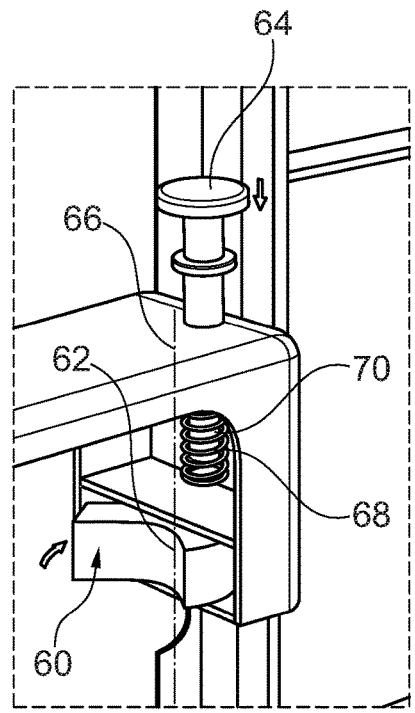
Figure 4C:
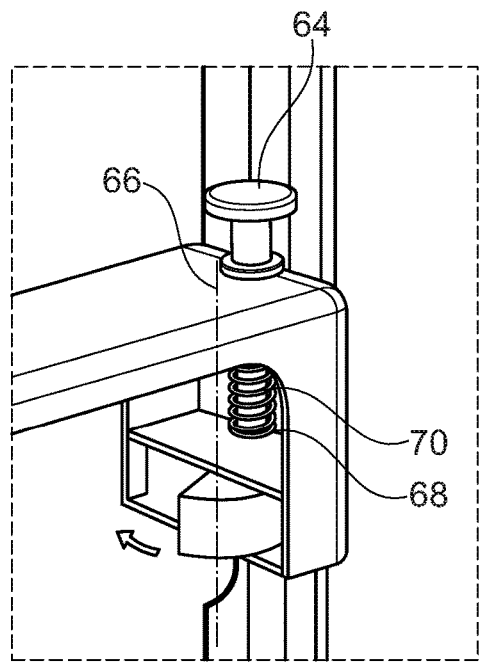

FIGS. 4a to 4c show a detail view of the second engagement element 46. In FIG. 4a, an insertion position is shown, at which a guiding section 60 of the second engagement element 46 is oriented roughly parallel to the walling 10 and extends parallel to the elongate stop component 38 towards its first end 40. A locking section 62 of the second engagement element 42 is positioned laterally outwards and thereby comprises a largest possible distance to the first engagement element 42 arranged opposite thereto. An operating element 64 rests on the elongate stop component 38 and allows the second engagement element 46 to freely rotate. This insertion position allows the insertion of a serving trolley 4 into the arrangement 2.

FIG. 4b shows a transition from the insertion position in FIG. 4a to a locking position in FIG. 4c. The guiding section 60 is exemplarily pressed to the walling 10 through an edge of the sidewall of the serving trolley 4, such that the locking section 62, which initially runs substantially perpendicular to the walling 10, is pulled through a rotation about a vertical axis 66 in the direction of the first end 40, until the end position shown in FIG. 4c is reached.

The operating element 64 exemplarily comprises a pin 70, which is supported in a spring-loaded manner by a spring 48, which pin may engage with an opening of the second engagement element 46 in order to automatically lock it in the locking position. The insertion position may correspond with an indentation in the second engagement element 46, which is designed in such a manner, that the second engagement element 46 is loosely held in the insertion position, but leaves it through pressing onto the guiding section 60, lifts the pin 70 up and lets it snap into an opening (not shown) in order to lock the second engagement element 46.

Figure 5A:
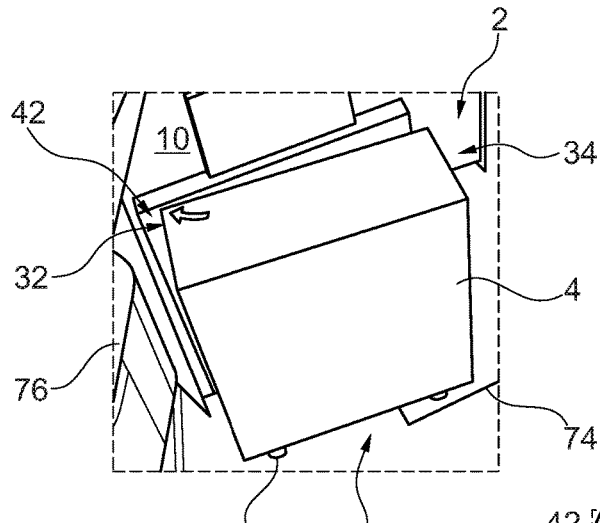
FIGS. 5a, 5b, and 5c show a sequence of steps for arresting a serving trolley.
Figure 5B:
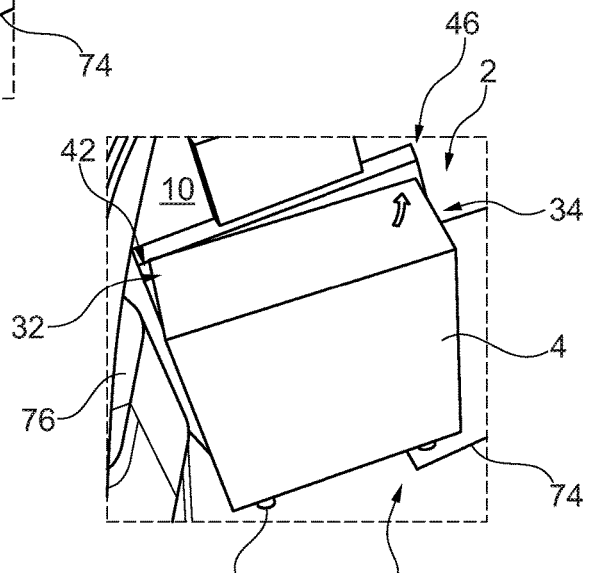
Figure 5C:
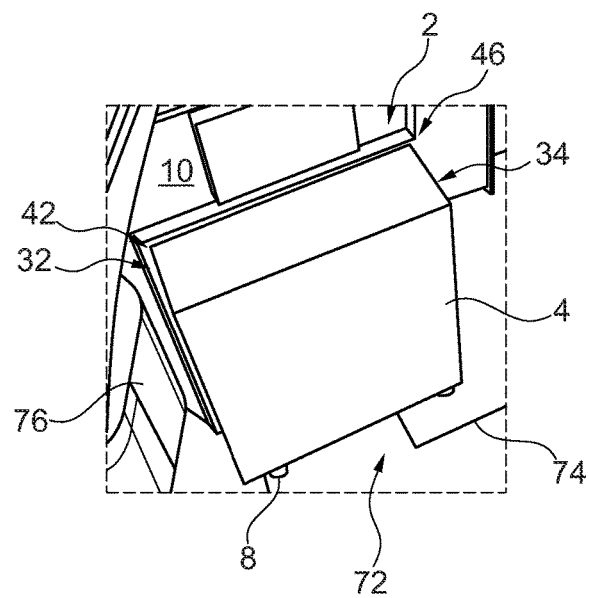

FIG. 5a shows the serving trolley obliquely in front of the walling 10, wherein the recess 32 is positioned shortly before engagement with the first engagement element 42. An engagement into the first engagement element 42 is shown in FIG. 5b, while the recess 34 is distanced from the walling 10 and the second engagement element 46. For latching in this, the serving trolley 4 is swiveled about the first engagement element 42, such that the recesses latches with the second engagement element 46 as shown in FIGS. 4a to 4c. Exemplarily, the arrangement 10 is shown in a door region 72 of a cabin 74 of an aircraft, which borders to a cabin door 76.

Figure 6:
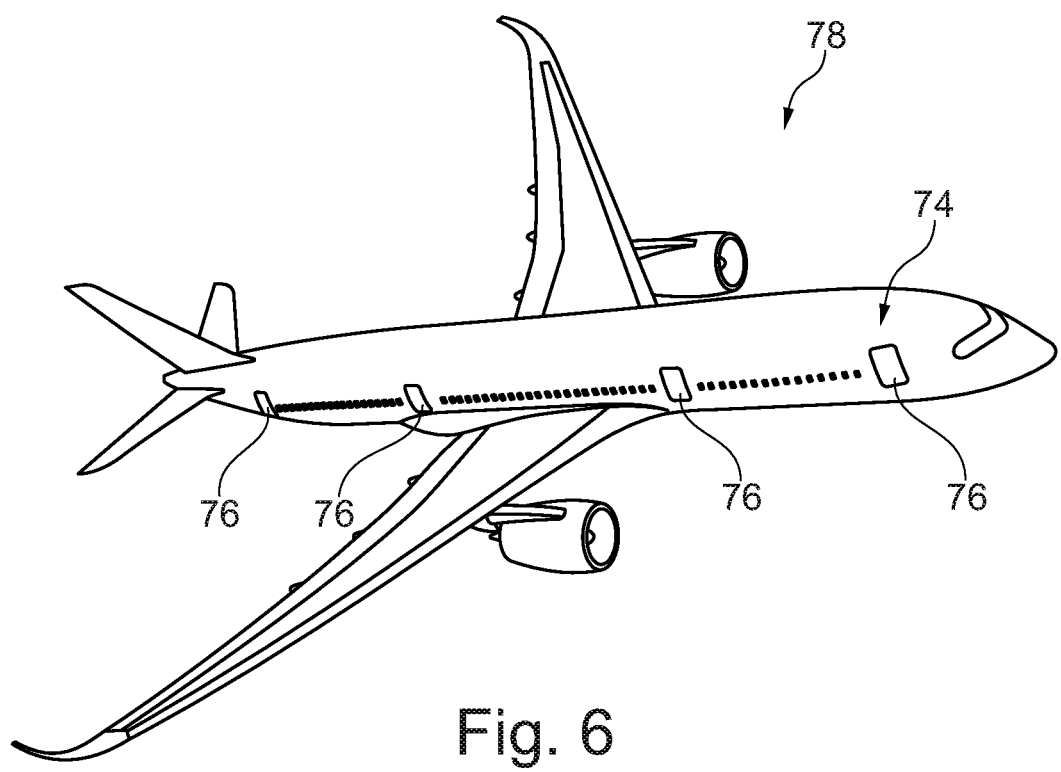
FIG. 6 shows an aircraft having a passenger cabin and an arrangement for arresting a serving trolley positioned therein.

Finally, FIG. 6 shows an aircraft 78 having a passenger cabin 74 installed therein as well as an arrangement 2 positioned therein according to the above description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement for selectively arresting a serving trolley in the cabin of an aircraft, comprising:
a walling extending perpendicularly to a cabin floor, which walling comprises a height, which is at least equal to the height of a serving trolley;
an upper arresting unit positioned at an upper fastening section of the walling; and
a lower arresting unit positioned at a lower fastening section of the walling that is distanced from the upper fastening section;
wherein the upper arresting unit comprises a first engagement element and a second engagement element, wherein at least one of the first engagement element and the second engagement element is movable relative to the respective other engagement element;
wherein the upper arresting unit is configured to engage two distanced recesses at an upper end of the serving trolley by way of the first engagement element and the second engagement element; and
wherein the lower arresting unit comprises at least one third engagement element and is configured to engage a bottom side component of the serving trolley by way of the third engagement element.

2. The arrangement according to claim 1:
wherein the upper arresting unit comprises a stop component, which runs perpendicular to the walling and parallel to the cabin floor, which stop component comprises a bottom side facing the cabin floor, the bottom side having a height that corresponds to the height of the serving trolley; and
wherein the first engagement element and the second engagement element are arranged at two opposed ends of the elongate stop component.

3. The arrangement according to claim 2, wherein one of the first engagement element and the second engagement element is movably supported along a longitudinal direction of the stop component on the stop component.

4. The arrangement according to claim 1, wherein the first engagement element and the second engagement element each comprise a thorn-like component, which substantially extend parallel to the cabin floor.

5. The arrangement according to claim 1, wherein at least one of the first engagement element and the second engagement element is movable in a plane arranged parallel to the cabin floor.

6. The arrangement according to claim 1, wherein the upper arresting unit comprises a variable length.

7. The arrangement according to claim 1:
wherein the first engagement element is rigidly supported on the upper arresting device;
wherein the second engagement element is bringable into an insertion position and a locking position; and
wherein the second engagement element is configured to automatically reach the locking position during insertion of the upper end of the serving trolley into the arrangement.

8. The arrangement according to claim 1, wherein the second engagement element is movable in a plane, which runs parallel to the walling.

9. The arrangement according to claim 1, wherein the upper arresting unit comprises a device or component to move the upper arresting unit in a direction perpendicular to the floor.

10. The arrangement according to claim 1, wherein the lower arresting unit comprises a third engagement element, which is supported so as to be foldable to the walling and is lockable in a state folded out from the walling.

11. The arrangement according to claim 1, wherein the first engagement element and the third engagement element extend into the same direction.

12. The arrangement according to claim 1, wherein the third engagement element comprises a flat, hook-shaped design.

13. An aircraft comprising:
a passenger cabin; and
at least one arrangement comprising:
a walling extending perpendicularly to a cabin floor, which walling comprises a height, which is at least equal to the height of a serving trolley;
an upper arresting unit positioned at an upper fastening section of the walling; and a lower arresting unit positioned at a lower fastening section of the walling that is distanced from the upper fastening section;

wherein the upper arresting unit comprises a first engagement element and a second engagement element, wherein at least one of the first engagement element and the second engagement element is movable relative to the respective other engagement element;

wherein the upper arresting unit is configured to releasably engage two distanced recesses at an upper end of the serving trolley by way of the first engagement element and the second engagement element; and wherein the lower arresting unit comprises at least one third engagement element and is designed for engaging a bottom side component of the serving trolley by way of the third engagement element.

14. The aircraft according to claim 13, wherein the walling is a part of a cabin monument.

15. The aircraft according to claim 13, wherein the walling is at least partially directed into a door region of the passenger cabin.

* * * * *